Mar. 27, 1923.
C. FRENCH
GAME
Filed Aug. 21, 1920
1,449,393
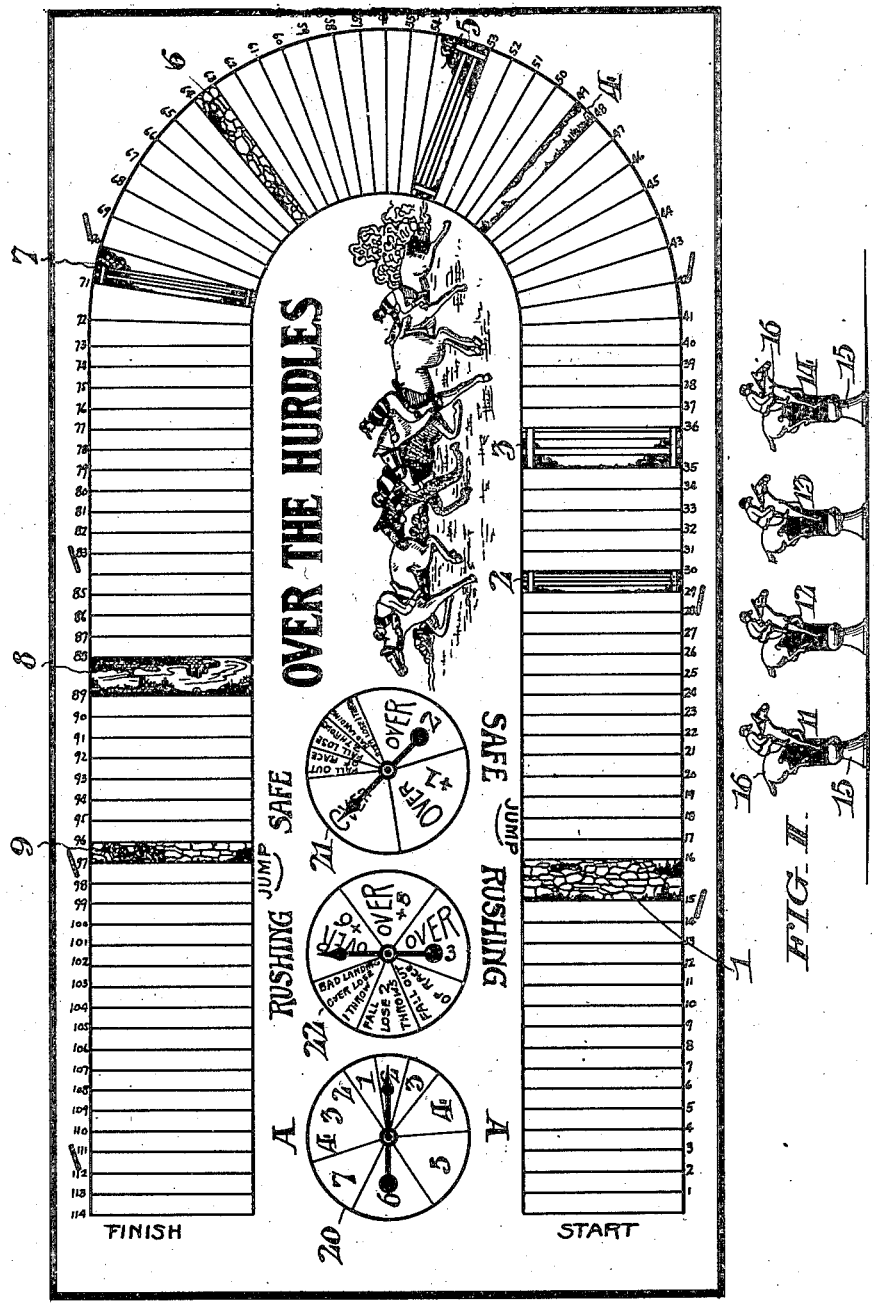
WITNESSES:
INVENTOR:
Clayton French,
BY
ATTORNEYS.

Patented Mar. 27, 1923.

1,449,393

UNITED STATES PATENT OFFICE.

CLAYTON FRENCH, OF UPPER DARBY, PENNSYLVANIA.

GAME.

Application filed August 21, 1920. Serial No. 405,093.

*To all whom it may concern:*

Be it known that I, CLAYTON FRENCH, a citizen of the United States, residing in Upper Darby, in the county of Delaware and State of Pennsylvania, have invented certain new and useful Improvements in Games, whereof the following is a specification, reference being had to the accompanying drawings.

My invention relates to games of the racing type, my object being to afford in a parlor game a fair similitude of the events and incidents of an actual race. I have hereinafter illustrated and described an embodiment of my invention as especially adapted to represent hurdle racing or the like, indicating the scope and essentials of my invention in my claims.

In the drawings, Fig. I is a plan view of a game board and accessories suitable for the purposes of my invention.

Fig. II shows a set of player pieces which can conveniently be used.

The board shown in Fig. I has thereon the representation of a U-shaped track on which are marked transverse lines indicating the positions or steps of progress along the track,—these lines being consecutively numbered for convenience in counting. At certain points are marked on the track, between consecutively numbered transverse lines, obstacles or hazards 1, 2, 3, etc., depicted as stone-walls, rail fences, streams, and the line. In Fig. II are shown a number of player pieces 11, 12, 13, and 14 comprising slotted wooden bases 15, each with a cardboard or other similar representation 16 of a horse and rider fitting tightly and so secured in the slot.

Between the two ends of the tracks are ranged play-controlling means comprising a plurality of play-controlling devices shown as having the form of spinning indicators 20, 21 and 22. The dial face of the device 20,—also marked "A",—is divided into a number of sectors of different sizes, variously numbered from one up to seven,— the sizes and numbering of such sectors being, as shown, such that the chances of spinning fairly large numbers predominate. This indicator 20 is used to control the normal progress of the players along the track. The other two indicators 21 and 22,— marked, respectively, "Safe" and "Rushing jump",—are used in connection with the various hazards 1, 2, 3, etc., and their dial faces are divided into segments which are appropriately marked to indicate the result of the supposed negotiation of the hazard. In correspondence with the names "Safe" and "Rushing", the dials of the indicators 21 and 22 are divided into sectors of different sizes, the larger of these sectors being marked to indicate various favorable results of the supposed jumps, and the smaller to indicate various penalties attached to supposed disasters in connection with the jumps. The "Safe" indicator 21, therefore, offers a greater chance of a favorable outcome from the jump than does the "Rushing" indicator 22; but the "Rushing" indicator offers the opportunity of greater gain if disaster is escaped than does the "Safe" indicator. Thus the indicators 21 and 22 afford diverse chances of success or failure, of progress and extent thereof, and of penalty and magnitude thereof, the hazards,—while in a general way, the indicators 20, 21, and 22 all offer diverse chances of progress and of advantage. The exact occasions for using the hazardous play-controlling means, comprising the "Safe" and "Rushing" indicators 21 and 22, may be variously determined,—as by the player's piece stopping on one of the positions within a certain number in front of the hazard, or by his over-passing the hazard through use of the spinner 20 (A), etc. While the game equipment described affords the possibility of considerable variations of play, it is thought that its mode of use will be sufficiently illustrated by the following detailed description of one such mode:

The pieces having been chosen by the players, the spinner "A" is used to determine their placing on the transverse line marked "Start" and the subsequent order of spinning,—the player spinning the lowest number taking the inside of the track, and so on. The player whose piece is on the inside of the track starts the game by spinning the spinner "A" and advancing his piece the number of position lines indicated; and the others follow suit in their respective turns. The players continue to use the spinner "A" throughout the game, excepting when one of them, approaching or in front of a hazard, spins a number which carries him over it. Thereupon, immediately or at his next turn, he must use one or the other of the hazardous spinners 21 and 22, at his option, to find out the result of his attempted negotiation of the hazard. If the result is "Over", he places his piece on the transverse line immediately beyond the hazard, or on such line beyond that line as is indicated by the number on the "over" sector on which the pointer stopped. If, on the other hand, the pointer stops on a penalty sector, he returns his piece to the position occupied before the use of spinner "A" which caused him to negotiate the hazard, and loses the opportunity of spinning for one or more subsequent turns. If the indicator stops on a sector marked "Fall out of race", he is entirely disqualified and drops out of the game. The choice as between the "Rushing" and "Safe" indicators 21 and 22, with their diverse advantages and disadvantages, will naturally depend upon the relative positions of the players, and on the nearness of the leading one to the transverse line marked "Finish".

Having thus described my invention, I claim:

1. A race-track game comprising, in combination, a track with hazards marked thereon; player pieces; and alternative play-controlling devices affording diverse chances of success or failure at the hazards.

2. A race-track game comprising, in combination, a track with hazards marked thereon; player pieces; and alternative play-controlling devices affording diverse chances of penalty at the hazards.

3. A race-track game comprising, in combination, a track with hazards marked thereon; player pieces; and alternative play-controlling devices affording diverse changes of progress and extent thereof at the hazards.

4. A race-track game comprising, in combination, a track with hazards marked thereon; player pieces; play-controlling means for normal progress on said track; and alternative play-controlling devices, affording diverse advantages, for use in connection with said hazards.

In testimony whereof, I have hereunto signed my name at Philadelphia, Pennsylvania, this 19th day of August 1920.

CLAYTON FRENCH.

Witnesses:
JAMES H. BELL,
E. L. FULLERTON.